United States Patent
Terada et al.

(10) Patent No.: US 6,950,221 B1
(45) Date of Patent: Sep. 27, 2005

(54) ELECTRODE STRUCTURE OF EC MIRROR

(75) Inventors: Yoshiyuki Terada, Shizuoka (JP); Takuo Mochizuka, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 666 days.

(21) Appl. No.: 09/926,657

(22) PCT Filed: May 21, 2001

(86) PCT No.: PCT/JP01/04205

§ 371 (c)(1),
(2), (4) Date: Nov. 29, 2001

(87) PCT Pub. No.: WO01/90810

PCT Pub. Date: Nov. 29, 2001

(30) Foreign Application Priority Data

May 22, 2000 (JP) .............................. 2000-150289

(51) Int. Cl.[7] ............................................. G02F 1/115
(52) U.S. Cl. ..................................................... 359/266
(58) Field of Search ............................... 359/265, 266, 359/267, 268, 269, 270, 271, 272, 273, 274, 359/275; 439/67, 493, 857

(56) References Cited

U.S. PATENT DOCUMENTS

| | | | |
|---|---|---|---|
| 5,148,306 A | * | 9/1992 | Yamada et al. .............. 359/271 |
| 5,640,274 A | | 6/1997 | Iwama et al. |
| 6,064,509 A | | 5/2000 | Tonar et al. |
| 6,198,615 B1 | * | 3/2001 | Pelosi et al. ................. 361/119 |

FOREIGN PATENT DOCUMENTS

JP  62270925 A  * 11/1987  ............. G02F 1/17

* cited by examiner

Primary Examiner—Georgia Epps
Assistant Examiner—Tuyen Tra
(74) Attorney, Agent, or Firm—Oblon, Spivak, McClelland, Maier & Neustadt, P.C.

(57) ABSTRACT

An electrically conductive metallic clip used for lead-out electrodes of an EC mirror has all-shaped section. One of an opposed side pieces of the clip is disposed at the side of an electrically conductive film and is formed in a planar shape. The other side piece disposed at the side of a glass substrate is configured in a curved shape and has a terminal that is outwardly round-opened. A central portion of the other side piece is formed in a convex shape so that an opening thereof is narrowed. When a sealing resin expands, an occurrence of poor contact between a lead-out electrode portion and the clip is prevented. Moreover, good workability for attaching the clip to the substrate is realized. Furthermore, the lead-out electrode is prevented from being damaged. Additionally, the clip is prevented from being deformed when the clip is fitted onto the substrate.

7 Claims, 3 Drawing Sheets

ELECTRODE STRUCTURE OF EC MIRROR

TECHNICAL FIELD

This invention relates to an electrode structure of an electrochromic mirror (hereunder referred to as an EC mirror) in which a lead-out electrode of an EC element is caught by an electrically conductive metallic clip.

BACKGROUND ART

A phenomenon, in which application of a voltage to a material causes an oxidation-reduction reaction, so that reversible colorization or decolorization of a material occurs, is referred to as electrochromism. An electrochromic element (hereunder referred to as an EC element) designed to use a material exhibiting such a phenomenon and to cause the colorization and decolorization of the material by voltage operation is utilized in the fields of a display device and a light control device.

Meanwhile, EC elements include the liquid type and the solid type. The solid type EC elements excel in visibility, safety, and durability and are suitably used for automotive mirrors (for example, outside mirrors, inside mirrors, and door mirrors).

The solid type EC elements are usually formed on transparent substrates, such as glass and plastic plates. A schematic view of an automotive EC mirror using such an Ec element is illustrated in FIG. 4.

This EC mirror is provided with a lower transparent electrode (that is, a conductive layer) 3 serving as a first electrode, as illustrated in FIG. 4. ITO (indium tin oxide) film, $SnO_2$ and so on are used as the materials of the electrode 3. For instance, a first EC layer 4 colored by a reduction reaction, an electrolytic layer 5, a second EC layer 6 colored by an oxidation reaction, and an upper-electrode and reflection film 7 (the materials of which are thin films made of metal, such as aluminum) are formed in sequence on this transparent electrode. A sealing material 8, which usually includes resins, such as an epoxy resin, and a sealing plate (or glass plate) 9 are superimposed thereon. Thus, an EC element is constructed.

For example, an iridium hydroxide (IRTOF) film is used as the first EC layer colored by a reduction reaction. For instance, a tungsten trioxide ($WO_3$) film is used as the second EC layer colored by an oxidation reaction. For example, a layer made of tantalum pentaoxide ($Ta_2O_5$) is used as the electrolytic layer. Incidentally, the first and second EC layers may be constructed by replacing the material of the first EC layer with that of the second EC layer.

A lead-out electrode is usually needed for applying an external power supply to the lower electrode and the upper electrode of such an EC element. Hitherto, the substrate 1 and a lead-out electrode 3a for the lower electrode 3 are sandwiched and the substrate 1 and a lead-out electrode 7a for the upper electrode 7 are sandwiched by electrically conductive metallic clips 2 enabling favorable soldering of a harness. Moreover, the clips 2 and the harness 10 are soldered to one another.

Conventional clips are made of resilient materials in such a manner as not to easily slip off the substrate. Small metallic clips usually shaped in such a way as to have a channel-like section or a substantially-heart-like section and as to be narrow at entrance and wide at inner part thereof are frequently used as the conventional clips. However, such conventional metallic clips are usually formed from a thin material, such as phosphor bronze, which is low in electric resistance (usually, the metallic clips are formed so that the thickness thereof ranges 0.05 mm to 2 mm). Thus, elastic stress is insufficiently introduced thereto, so that the conventional shape thereof makes it difficult to exert a sandwiching force sufficient to the extent that the slip-off thereof is prevented.

Thus, the conventional clips are formed by infiltrating the sealing resin 8 into a gap 11 between a side piece of the clip 2 and the substrate 1 and fixing the clips 2 and the substrate 1 to each other by the sealing resin 8.

However, the sealing resin (for example, an epoxy resin) infiltrated into the gap 11 expands under a high temperature and humidity condition. This expanded sealing resin pushes up the terminal of the clip (see an explanatory view of an electrode portion of the clip when the sealing resin is expanded, which is illustrated in FIG. 5), poor contact between a conductive surface and the clip is liable to occur.

Further, when the clip is fitted onto the substrate, it is necessary to force the entrance of the clip open because the entrance of the clip is narrow. Thus, the workability of the conventional EC element is poor. Moreover, when the clip is fitted onto the substrate, the conductive surface is easily damaged. Furthermore, this metallic clip is easy to be deformed when fitted onto the substrate.

The invention is accomplished in view of the aforementioned circumstances. An object of the invention is to provide a structure enabled to prevent occurrences of troubles, such as poor contact between the conductive surface and the metallic clip of the EC element when the sealing resin expands, and to facilitate the fitting of the metallic clip onto the substrate.

That is, an object of the invention is to provide an electrode structure of an EC mirror, in which clip electrodes enabled to realize good workability of attaching the clips to the substrate, to prevent lead-out electrode portions from being damaged, and to increase a fitting force for fitting thereof to the substrate thereby to make the clips difficult to slip off the substrate are attached to lead-out electrodes of an EC element.

DISCLOSURE OF INVENTION

According to the present invention, there is provided a clip for an EC mirror, which is a metallic clip formed by providing both side pieces on both side edges of an electrically conductive strip-like metallic plate in such a way as to face each other and to be integral with each other thereby to constitute one channel-type section as a whole. In this clip, one of both the side pieces, which is disposed at the side of a conductive surface, is formed in a planar shape in such a manner as to be able to be in planar and intimate contact with the conductive surface, and the other of both the side pieces, which is disposed at the back side of a substrate, has a terminal portion thereof shaped in such a way as to be outwardly opened, and also has a central portion thereof formed in a protruding shape in such a manner as to be bent toward the inside of the clip and as to narrow an inner opening thereof, to thereby impart elastic property thereto.

When the clip of such a configuration is used by being attached to an EC element in such a way as to catch a led-out electrode thereof, the contact area and the contact length between the conductive surface and the clip can be increased because one of the side pieces, which is placed at the side of the conductive surface, is formed in a planar shape in such a manner as to be able to be in planar and intimate contact with the conductive surface. Moreover, poor contact between the conductive surface and the clip can be prevented from being caused owing to the infiltration of a sealing resin into gap therebetween.

Further, the other of both the side pieces, which is disposed at the back side of a substrate, has a terminal portion thereof shaped in such a way as to be outwardly opened, and also has a central portion thereof formed in a protruding shape in such a manner as to be bent toward the inside of the clip and as to narrow an inner opening thereof, to thereby impart elastic property thereto. Thus, the clip is easily fitted onto the substrate. Moreover, the workability for attaching the clip to the substrate is good. Furthermore, the lead-out electrode is difficult to damage. Additionally, the magnitude of the fitting force is high.

BEST MODE FOR CARRYING OUT THE INVENTION

An embodiment of the invention is described hereinbelow in more detail with reference to the accompanying drawings.

Figure 1:
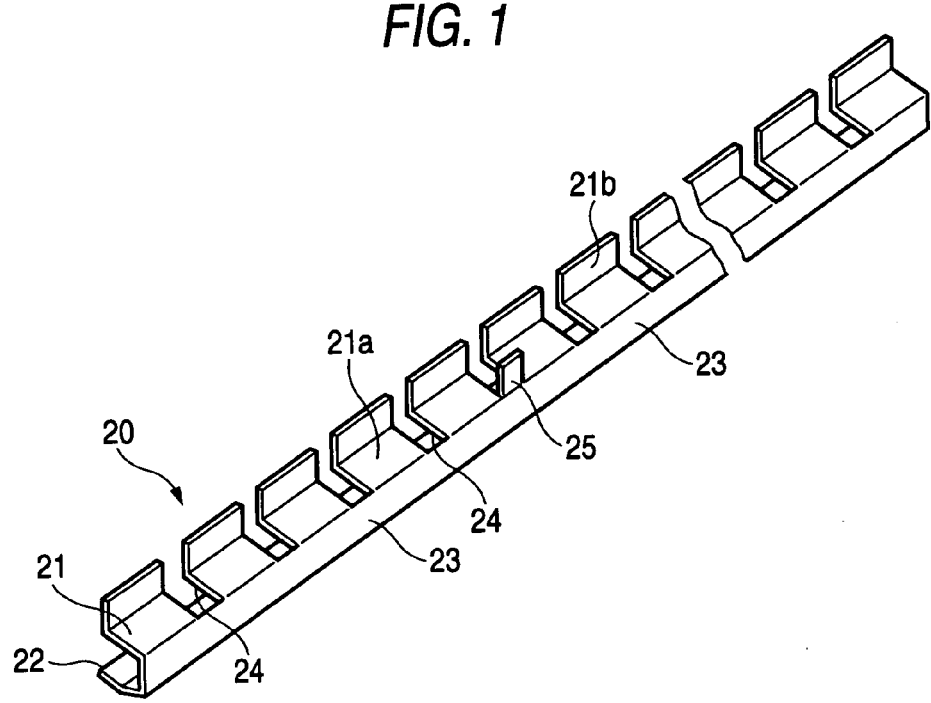
FIG. 1 is a perspective view illustrating an embodiment of a clip of the invention.
Figure 2:
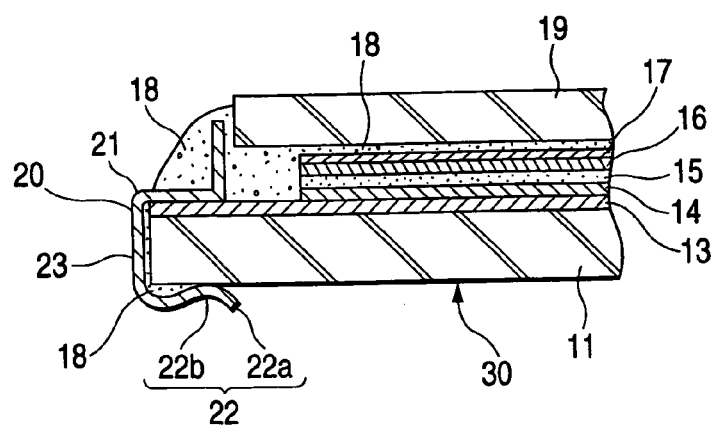
FIG. 2 is an enlarged sectional view illustrating a state in which a lead-out electrode portion of an EC mirror is caught by the clip.
Figure 3:
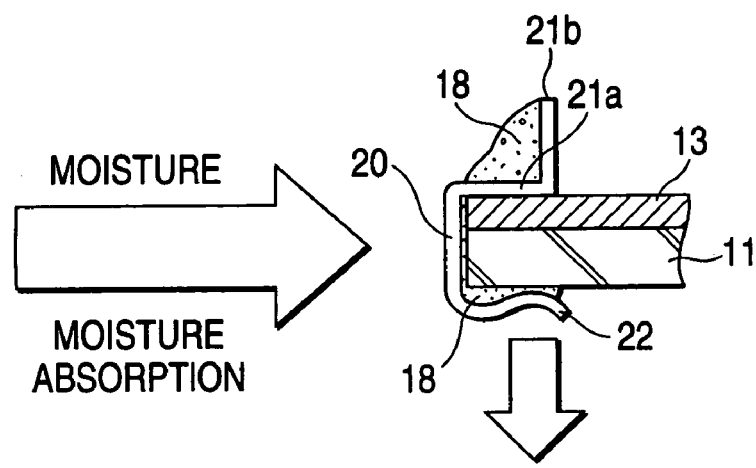
FIG. 3 is an explanatory view illustrating the positional relation between the clip of the invention and a conductive surface of the EC mirror during a sealing resin expands.
Figure 4:
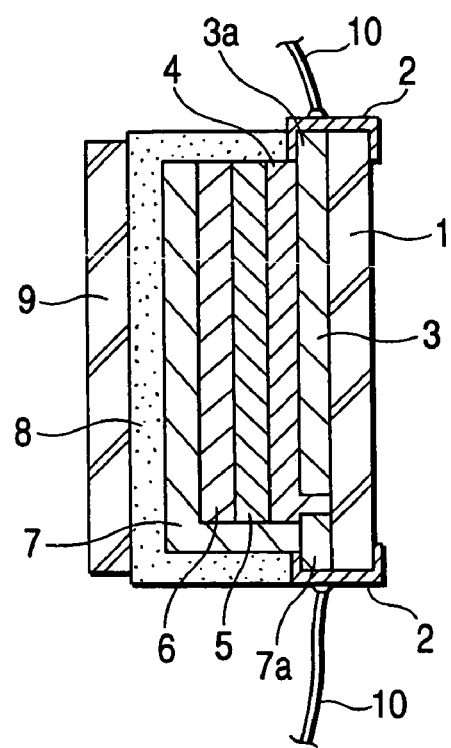
FIG. 4 is a schematically sectional view illustrating an automotive EC mirror using a conventional EC element.
Figure 5:
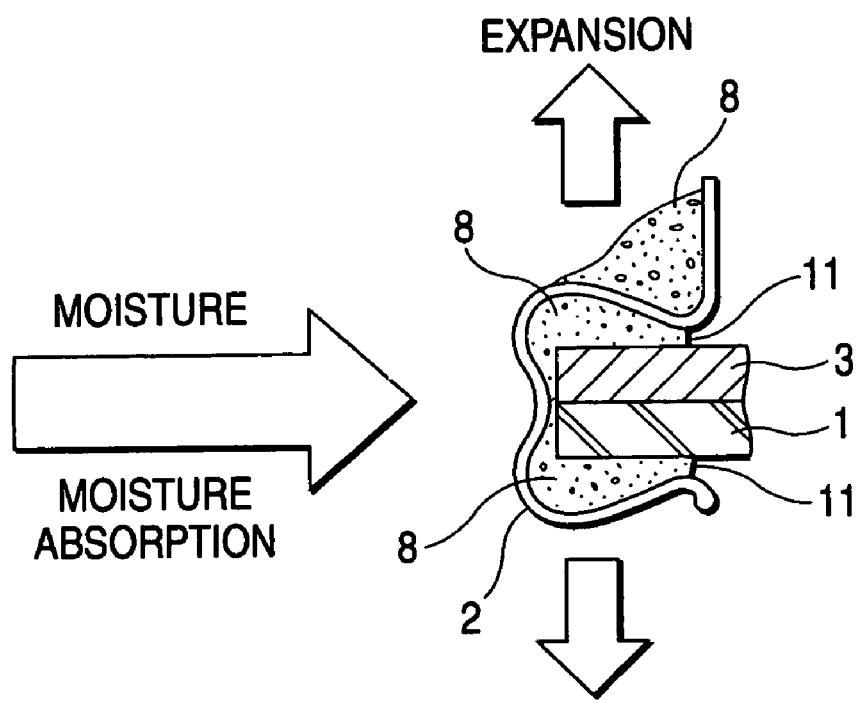
FIG. 5 is an explanatory view illustrating the positional relation between a conventional clip and a conductive surface of the EC mirror during a sealing resin expands.

FIG. 1 is a perspective view illustrating an electrically conductive metallic clip 20. FIG. 2 is an enlarged sectional view illustrating an electrode portion of an EC mirror 30, to which the electrically conductive metallic clip is attached, and showing a state in which a lead-out (electrode) portion a substrate 11 is caught by the clip 20.

In FIG. 2, reference numeral 11 designates a transparent substrate constituted by a glass plate and so forth, and formed in a convex surface shape. Reference numeral 13 denotes a lower transparent electrically conductive film serving as a first electrode, which is formed on the top surface of the transparent substrate 11. For example, ITO or SnO$_2$ is employed as the material of the film 13. Furthermore, a first coloring layer 14 made of IRTOF and so forth, a solid electrolyte layer 15, a second coloring layer 16 made of a tungsten trioxide and so on, and an upper-electrode and reflecting layer 17 (the materials thereof are Al, Ag and so forth) serving as a second electrode are serially formed thereon. These layers are covered with an electrically insulating epoxy resin 18 and a glass protective substrate 19.

Meanwhile, lead-out electrode portions are formed in a predetermined pattern by using the electrically conductive film, which is formed on the substrate 11, so as to apply a voltage to both the electrodes. Each of the lead-out electrode portions is sandwiched by the clips 20 according to the invention, which are shown in FIG. 1. Each of terminals of the clips 20 is soldered to a harness (not shown).

The clip 20 is formed by integrally installing side pieces 21 or 22 in range with a corresponding one of both side edge portions of a strip-like connection plate 23 made of an electrically conductive metallic material so that the side pieces face each other, and that the side edge portions of the plate 23 and the side pieces constitute substantially one channel-type section.

One of the side pieces 21, which is placed at the side of the conductive surface (that is, the lower electrode 13) of the EC mirror 30 is formed in such a way as to have a planar portion 21a and a flap portion 21b extended therefrom. An end portion 22a of the other side piece 22 disposed at the side of the glass surface is formed in a curved shape in such a way as to be outwardly opened. Moreover, the central portion of the side piece 22 is formed in a convex shape 22b so that a clip opening is narrowed.

Further, a large number of expanding slots 24 are formed at arbitrary intervals in both the opposed side pieces 21 and 22, as illustrated in FIG. 1. Such expanding slots 24 are formed so that the clip is easily bent in the longitudinal direction. Each of the expanding slots 24 may have a section of a given shape, such as a V-shape, and a U-shape. Reference numeral 25 designates a terminal provided by being cut up, for example, at an upper portion of the side piece provided at the side of the upper electrode film in such a way as to protrude therefrom. The terminal 25 is adapted so that a harness can be soldered thereto or connected thereto by a means, for instance, by being wound therearound.

Incidentally, the position of this terminal may be arbitrarily set. That is, the terminal may be formed at a tip end of the side piece. Alternatively, the terminal may be provided at a lower portion of the side piece 22.

Further, phosphore bronze is cited as a favorable metal for imparting elastic property to the clip. Additionally, stainless steel, steel, and beryum copper alloy may be used. A contact face between this metallic clip and the lead-out (electrode) portion may be plated with an electrically conductive material, such as tin.

A predetermined DC voltage is applied between the upper electrode and the lower electrode through the harness. The EC mirror is adapted so that when the polarity of the voltage is changed, an oxidation-reduction reaction is electrochemically caused in the first and second EC layers, and that the colorization or decolorization of the first EC layer and the second EC layer is performed. This EC mirror performs the functions of a glare-proof mirror by utilizing change in reflectivity, which is caused by change in absorption coefficient for light passing therethrough due to an occurrence of the phenomenon of the colorization or decolorization.

INDUSTRIAL APPLICABILITY

As described above, according to the invention, between both opposed side pieces of the clip having the channel-type section, one of the side pieces, which is positioned at the side of the conductive surface, is formed in a planar shape. Thus, the degree of adhesion between this side piece and the lead-out electrode portion is increased. The other side piece placed at the side of the glass substrate has a terminal, which is formed in a curved shape and outwardly round-opened. Thus, the invention has advantages in that when the clip is fitted onto the substrate, the clip is easily inserted thereonto, that further, the lead-out electrode is difficult to damage, and that furthermore, when the clip is attached to the substrate, the clip is hard to deform.

Further, the central portion of the side piece at the side of the glass substrate is R-shaped and protrudes in such a way as to be inwardly convex. Thus, a sandwiching force to be exerted on the substrate so as to prevent the clip from slipping off the substrate can be increased. In an experiment conducted by the inventor of the invention, the clip of the invention caught a glass substrate. Then, a fitting force of this clip was measured by an autograph. Subsequently, the measured fitting force of the clip of the invention was compared with that of a conventional clip. Thus, the inventor of the invention ascertained that such a force of catching the substrate (that is, a force of attaching thereof) in the case of the conventional clip was 87.5 gf (n=10), while that in the case of the clip of the invention was 98.3 gf (n=10), and that the clip of the invention had the effect that the fitting force increased 11% or more. Furthermore, a high-temperature high-humidity test was performed on the clip of the invention. Then, it was ascertained that the expansion of a sealing resin caused no poor contact between the lead-out electrode portion and the clip.

Further, in the clip of the invention, a large number of expanding slots are formed in both the opposed side pieces in such a manner as to extend in a direction perpendicular to the longitudinal direction of the electrode. This causes both the side pieces of the clip to lose the aptitude to bend or corrugate. Moreover, even when the end surface of the substrate has a curvature, the clip electrode can easily be bent along the substrate. Thus, the contact area between the lead-out electrode portion and the clip electrode is increased. Consequently, the invention has the effect that the degree of adhesion between the clip and the substrate is increased.

What is claimed is:

1. A clip for an EC mirror, including a metallic clip formed by providing both side pieces on both side edges of an electrically conductive strip-like metallic plate facing each other and integral with each other thereby to constitute one channel-type section as a whole, said clip, wherein:
    one of both said side pieces, which is configured to be disposed at a side of a conductive surface, is formed in a planar shape to be able to be in planar and intimate contact with the conductive surface;
    the other of both said side pieces, which is configured to be disposed at a back side of a substrate, includes a terminal portion shaped to be outwardly opened; and
    a central portion is formed in a protruding shape bent toward an inside of said clip and narrowing at an inner opening thereof, to thereby impart an elastic property thereto.

2. An electrode structure for an EC mirror having an electrode portion in which a transparent electrically conductive film serving as a first electrode, an EC film to be formed on said transparent electrically conductive film, and a second electrode and reflecting film to be formed on said EC film are sequentially formed on a transparent substrate, and in which a sealing resin layer and a protective layer are provided thereon, and in which metallic clips are attached to lead-out electrodes for said first electrode and said second electrode, wherein:
    said clip is formed by providing either of a first side piece or a second side piece on both side edges of a strip-like connection plate, which is made of an electrically conductive metallic material, facing each other and integral with each other thereby to constitute substantially a channel-type section as a whole;
    the clip is contacted with or in close proximity to the sealing layer;
    one of said first and second side pieces, which is disposed at a side of a conductive surface, of said clip is formed in a planar shape; and
    the other of said first and second side pieces, which is disposed at a side of a substrate, includes a terminal portion thereof shaped outwardly opened, and a central portion is formed in a convex shape narrowing an inner opening thereof such that an elastic property is imparted to the clip.

3. The electrode structure for an EC mirror according to claim 2, wherein an expanding slot is formed in each of said side pieces of said clip in a direction perpendicular to a longitudinal direction thereof, and wherein a terminal for an external wire connection is formed on one of both said side pieces.

4. A clip for an EC mirror, comprising:
    an electrically conductive strip-like plate;
    a plurality of first side pieces on a first side edge of the electrically conductive strip-like plate includes a planar portion and a flap portion extending from said planar portion; and
    a plurality of second side pieces on a second side edge of the electrically conductive strip-like plate;
    wherein the plurality of first side pieces and the plurality of second side pieces face each other and are integral with each other thereby forming one channel-type section;
    each of the plurality of first side pieces is configured to be disposed at a side of a conductive surface and is formed such that the planar portion is in planar and intimate contact with the conductive surface; and
    each of the plurality of second side pieces is configured to be disposed at a back side of a substrate and includes,
        a terminal portion shaped to outwardly opened, and
        a central portion formed in a protruding shape thereby bending toward an inside of said clip and narrowing at an inner opening thereof such that an elastic property is imparted to the clip.

5. An electrode structure for an EC mirror, comprising:
    an electrode portion including,
        a transparent electrically conductive film serving as a first electrode,
        an electrochromic film formed on said transparent electrically conductive film,
        a second electrode and a reflecting film formed on said electrochromic film, wherein said transparent electrically conductive film, said electrochromic film, said second electrode and said reflecting film are sequentially formed on a transparent substrate with curvature, and
        a sealing resin layer and a protective layer provided on said sealing resin layer; and
    at least one electrically conductive clip attached to lead-out electrodes of said first electrode and said second electrode;
    wherein said electrically conductive clip includes first side pieces and second side pieces on both side edges of a strip-like connection plate thereby forming a substantially channel-type section;
    said first side pieces are disposed at a side of a conductive surface and include a planar portion and a flap portion extending from said planar portion; and
    each of the second side pieces is disposed at a side of a substrate and includes,
        a terminal portion thereof shaped to be outwardly opened, and
        a central portion formed in a convex shape narrowing an inner opening of said electrically conductive clip such that an elastic property is imparted to the clip.

6. The electrode structure for an EC mirror according to claim 5, wherein an expanding slot is formed in each of said first and second side pieces of said clip in a direction perpendicular to a longitudinal direction thereof.

7. The electrode structure for an EC mirror according to claim 5, wherein a terminal for an external wire connection is formed on one of said first and second side pieces.

* * * * *